Nov. 19, 1957 C. R. KOLLER 2,813,776
PROCESS FOR FORMING FILMS AND FILAMENTS
DIRECTLY FROM POLYMER INTERMEDIATES
Filed Feb. 21, 1955

INVENTOR
CHARLES A. KOLLER

BY Francis H. Deef
ATTORNEY

United States Patent Office 2,813,776
Patented Nov. 19, 1957

2,813,776

PROCESS FOR FORMING FILMS AND FILAMENTS DIRECTLY FROM POLYMER INTERMEDIATES

Charles R. Koller, New Castle, Del., assignor to E. I. du Pont de Nemours and Company, Wilmington, Del., a corporation of Delaware Application February 21, 1955, Serial No. 489,584

20 Claims. (Cl. 18—54)

This invention relates to a process. More particularly it concerns a process for forming a shaped body having a continuous cross section, by combination of two liquid complementary reactive polymer intermediates, the said combination being accomplished by extruding one of the said intermediates into the other.

It is an object of the present invention to provide a process for the production of a shaped body of continuous cross section by combination of two liquid complementary reactive polymer intermediates.

Another object is to provide a process for the production of an elastic shaped body of continuous cross section by combination of two liquid complementary reactive polymer intermediates.

These and other objects will become apparent in the course of the following specification and claims.

In accordance with the present invention a process is provided which comprises forming a solid shaped structure by combining at least two liquid complementary reactive polymer intermediates, one of which contains at least two active hydrogens more reactive than alcoholic hydrogen, whereas its complement contains at least two reactive groups capable of reacting with alcohol at room temperature to form an ester, and at least one of the said complementary reactive polymer intermediates being a multifunctional organic macromolecule, having a molecular weight within the range of from about 400 to about 7000, the said macromolecule consisting essentially of at least one member selected from the group consisting of a hydrocarbon polymer, a polyether and a polythioether, and at least one of the other of the said complementary reactive polymer intermediates being a polyfunctional, essentially monomeric, organic molecule, the proportionate molecular weights of macromolecular intermediate to the essentially monomeric molecular intermediate being such that at least about 30% by weight of the final shaped structure is contributed by the macromolecular intermediate while at least about 10% by weight of the final shaped structure is contributed by the essentially monomeric molecular intermediate, the combination of the said complementary intermediates being accomplished by extrusion through an orifice of one said complementary polymer intermediate into the other.

The liquid complementary reactive polymer intermediates correspond to the formulae:

$$R—(X)_n$$
$$R'—(Y)_n$$

wherein $n$ is a small integer greater than 1, X is hydrogen more active than alcoholic hydrogen, Y is a group capable of reacting with alcohol at room temperature to form an ester, R and R' are members of the class consisting of the radical of a polyfunctional essentially monomeric organic polymer intermediate and the radical of a polyfunctional macromolecular polymer intermediate having a molecular weight range of from about 400 to about 7000 and consisting essentially of a hydrogen polymer, a polyether and a polythioether. As previously mentioned, in the process of the present invention, the complementary reactive polymer intermediates are so chosen that at least 30%, preferably 60% of the weight of the final shaped article is contributed by the polyfunctional organic macromolecule whereas at least 10% of the weight of the final shaped article is contributed by the polyfunctional, organic, essentially monomeric molecule.

By the expression "a shaped body of continuous cross section" is meant a solid structure in the nature of a filament or film whose cross section is uniform and unbroken as opposed to structures which have soft or hollow centers. The terms "monomeric" and "essentially monomeric" are used interchangeably to signify a monomer or a "polymer" having a low degree of polymerization, i. e., dimer, trimer, etc. The term "polyfunctional" indicates the presence upon the molecule of at least two reactive groups capable of reaction with a complementary functionally substituted molecule to form a polymer under conditions of the present invention. The expression "polymer . . . intermediate" denotes a molecule polyfunctionally substituted and capable of reacting with a complementary polyfunctionally substituted molecule to form a polymer under reaction conditions of the present invention.

Figure 1:
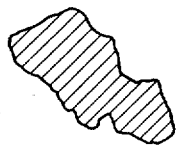
Figure 1 is a diagrammatic sketch of the typical spinning set-up of the present invention.

In Figure 1 one of the reactive intermediates is supplied through the supply tube 2 and extruded through the orifice 3 into the other complementary reactive polymer intermediate 1. The filament 4 which is formed by the reaction of the two intermediates is then led around the rollers 5 and 6 to be wound in the conventional manner.

The following examples are cited to illustrate the invention. They are not intended to limit it in any manner.

Among the physical properties reported for the products in the examples, "polymer melt temperature" is the minimum temperature at which a sample of the polymer leaves a wet, molten trail as it is stroked with moderate pressure across a smooth surface of a heated brass block. "Fiber stick temperature" is the temperature at which the fiber will just stick to a heated brass block when held against the surface of the block for 5 seconds with a 200 gram weight. "Zero strength temperature" is the average temperature at which the two ends of the fiber break if heating is continued with the weight left on after the fiber stick temperature has been determined. "Initial modulus" is determined by measuring the initial slope of the stress strain curve. The invention has particular value in the preparation of articles having high elasticity. In reporting this property those structures are included which exhibit elastic recoveries above 90% and stress decays below 20%. Elastic recovery is the percentage return to original length within one minute after the tension has been released from a sample which has been elongated 50% at the rate of 100% per minute and held at 50% elongation for one minute. Stress decay is the percent loss in stress in a yarn one minute after it has been elongated to 50% at the rate of 100% per minute.

Example 1

A poly(tetramethylene oxide) glycol with a molecular weight of 3300 and prepared as described in the literature, is provided with reactive isocyanate ends by reacting one mol of the glycol with two mols of 4-methyl-m-phenylene diisocyanate. The reactants are heated at 80° C. for 4 hours with stirring to produce a syrupy liquid with a viscosity of 350 poise at room temperature. This syrupy liquid is extruded through a 6 mil one-hole spinneret into a xylene bath containing 5% by weight of triethylenetetramine heated to 70° C. The filament is wound up at 77 feet per minute and air dried. The as-spun filaments have the following properties: Tenacity=0.26 g. p. d., elongation=704%, initial modulus= 0.02 g. p. d., denier=86.

Example II

A macroglycol is prepared by mixing 333 grams (3.7 mols) of 1,4-butanediol, 452 grams (3.7 mols) of hydroxyethylthioether, 15 grams of p-toluenesulfonic acid as catalyst, and 150 ml. of toluene, blanketing with nitrogen, and refluxing for 5.5 hours while removing water azeotropically. The reaction mixture is washed with 600 ml. of an aqueous 5% sodium carbonate solution and then with 600 ml. of water. The product is further purified by dissolving in 500 ml. of benzene, treating with 50 grams of alumina, filtering, redissolving the filtrate in benzene, treating with an activated carbon, and filtering. The solvent is removed from the filtrate under vacuum on the steam bath until the final pressure reaches 0.5 mm. The product contains 2.03% hydroxyl groups and has an average molecular weight of 1675.

This product (20.0 grams=0.012 mol) is mixed with 2.41 grams (0.024 mol) of triethylamine and 20 ml. of dry benzene and the mixture added over a period of 12 minutes to a solution of 5.70 grams of sebacyl chloride in 20 ml. of dry benzene. The reaction mixture is allowed to stand for four hours at room temperature.

It is filtered and sufficient dry benzene added to give a total volume of solution of 60 ml.

This macrointermediate having acid chloride ends is extruded through a one-hole spinneret into liquid triethylenetetramine at room temperature. Clear, lustrous filaments are obtained.

Example III p,p'-Methylenediphenylisocyanate (10.6 grams=0.042 mol) is heated with 50 grams (0.016 mol) of Tetronic (a tetrahydroxypolyether from Wyandotte Chemicals) in 25 ml. of dioxan for one hour at steam bath temperatures. The reaction mixture is extruded through an 8 mil one-hole spinneret at 240 p. s. i. into a 100% ethylenediamine bath maintained at room temperature. The filaments obtained are removed from the bath at 30 feet per minute and transferred through air to a second roll, which takes up the filaments at 58 feet per minute. They are then wound up at 48 feet per minute on a bobbin immersed in water. After relaxing in boiling water, the as-spun filaments have the following properties: Tenacity=0.08 g. p. d., elongation=96%, initial modulus=0.05 g. p. d., denier=129, stress decay=1.8%, tensile recovery=99%, and fiber stick temperature=210° C.

Example IV

Poly(tetramethylene oxide) glycol (56.7 grams=0.036 mol) having a molecular weight of 1575 is reacted with 1.44 grams (0.012 mol) of trimethylolethane and 18.0 grams (0.072 mol) of p,p'-methylenediphenylisocyanate in 25 ml. of dioxan for one hour on the steam bath. The reaction mixture is extruded through an 8 mil one-hole spinneret at 200 p. s. i. into a 100% ethylenediamine bath at room temperature. The filaments are removed from the bath at 29 feet per minute and collected at the rate of 46 feet per minute on a bobbin immersed in water. After relaxing in boiling water, the as-spun filaments have the following properties: Tenacity=0.63 g. p. d., elongation=542%, initial modulus=0.05 g. p. d., denier=66, stress decay=5.9% and tensile recovery=96%.

Example V

Chlorosulfonated polyethylene ("Hypalon 1287"—a chlorosulfonated polyethylene supplied by the du Pont Company) is dissolved in toluene to produce a solution containing 25% solids, which is extruded into 100% triethylenetetramine at room temperature. The solution is extruded through an 8 mil one-hole spinneret under a pressure of 110 p. s. i., and the filament is wound up at 44 feet per minute. After being washed in acetone and dried, the as-spun filament has the following properties: Tenacity=0.3 g. p. d., elongation=110%, initial modulus=0.07 g. p. d., and denier=83.

Example VI

Ethyl acrylate (90 grams), acrylyl chloride (10 grams) and a diazo catalyst (1 gram) are mixed with 200 ml. of benzene and the solution refluxed for 9 hours. Excess solvent is removed to give a viscous solution of the copolymer, which is extruded through an 8 mil one-hole spinneret into an 86% aqueous solution of hexamethylenediamine maintained at room temperature. Continuous filaments are obtained which are insoluble in boiling benzene.

Example VII

Poly(ethylene oxide) glycol with a molecular weight of 400 is reacted with excess phosgene to produce the bischloroformate. A carbon tetrachloride (50 ml.) solution containing 21 grams of this product per 100 ml. of solution is mixed with 50 ml. of carbon tetrachloride solution containing 10 grams of sebacyl chloride per hundred ml. of solution. The combined solutions are extruded through an 8 mm. orifice into an aqueous bath containing 5% by weight of hexamethylenediamine. The filaments are withdrawn from the bath at 15 feet per minute and wound up at 30 feet per minute in methanol at 40° C. The dry filaments can be drawn at 2.5X at 90° C. and have a zero strength temperature of 186° C. The polymer in these filaments has an inherent viscosity in m-cresol of 1.21.

As will be apparent from the examples above, the polymer comprising the final shaped article may be of the linear, cross-linked or a combination of the two varieties. Furthermore, the polymeric product, regardless of its variety of linkage, may be of a coupled type, i. e. only one of each of two complementary intermediates is used in its production, or segmented, i. e. a mixture of at least two homofunctional species of one intermediate is reacted with one or more species of complementary homofunctional intermediates. In the formation of the segmented products the speed of reaction between the various complementary intermediates is preferably substantially equal. It is preferable that the speed of reaction of the fastest reacting complementary intermediates be close to the speed of reaction of the slowest reacting complementary intermediates in any particular system.

The invention is particularly useful in the preparation of shaped articles possessing elasticity. The degree of elasticity will vary somewhat with the identity of the complementary polymer intermediates.

The effect of the macromolecular polymer intermediates is particularly pronounced in this regard. In general, highly elastic products may be formed with macromolecular intermediates having a molecular weight in the lower end of the range specified, i. e., around 400, provided the product is cross-linked or segmented with units of polymer derived from essentially monomeric polymer intermediates. A macromolecular intermediate of somewhat higher molecular weight, around 800, is preferable, when the product formed is a linear coupled polymer. The use of a macromolecular intermediate having a melting point no higher than about 50° C. is particularly advantageous in imparting elasticity to the final product.

The elastic properties of the structures obtained is varied to a lesser extent by the essentially monomolecular intermediates. This applies particularly to the structures derived from linear polymers prepared by the process of the invention. For example, if each reaction phase contains an essentially monomeric intermediate in addition to the macromolecular intermediate (present with at least one essentially monomeric intermediate) the product obtained will be a segmented copolymer as previously defined. For optimum elastic properties of such structure it is preferred that these two complementary essentially monomeric intermediates be capable of reacting together to form a polymer with a polymer melt temperature above 200° C. in the fiber-forming molecular weight range. The higher the melting point of this segment, the closer the molecular weight of the macromolecular intermediate can approach the minimum value and still retain excellent elasticity. If the reactive macromolecular intermediate is extruded into a liquid comprising only one complementary, essentially monomeric fast-reacting intermediate, then it is preferred that this essentially monomeric intermediate be capable of reaction with the end groups of the macromolecular intermediate to form a polymer which melts above 250° C. in the fiber-forming molecular weight range. The variation of elasticity caused by the character of the essentially monomolecular intermediate, as mentioned above, is much less pronounced when cross-linked structures are prepared. However, generally it is preferred that the final structure contain only a small number of cross-links per molecule. This can be accomplished by using a relatively high molecular weight macromolecular intermediate (one having a molecular weight in the range of about 3000 to about 5000) or by using at least two complementary essentially monomeric intermediates, one of which is difunctional and one of which is multifunctional, the latter representing a small percentage of the mixture.

The use of a macromolecular intermediate having a molecular weight above the indicated minimum values has an advantage due to the fact that a high molecular weight fiber-forming polymer is obtained by combination of a relatively small number of molecules. As a result, little byproduct is formed, particularly where polymerization proceeds by condensation. This simplifies threadline formation and attendant purification processes. Furthermore, high solids spinning dopes (i. e. the material extruded) can be used, which reduces solvent removal and recovery problems. An important end result is the ready formation of solid structures, such as filaments and films, rather than collapsed tubular filaments or laminated films. For these reasons the use of at least one macromolecular intermediate having a molecular weight of about 1000 to about 5000 is preferred.

The liquid complementary reactive polymer intermediates are combined in accordance with the present invention, by extruding at least one such intermediate through an orifice into its complement and the shaped article formed is led away from the orifice as it forms to a reel or other suitable conventional wet-processing collecting means. Generally it is preferred to extrude the phase containing the macromolecular intermediate. For spinning fibers extrusion may be through a conventional wet-spinning spinneret. A spinneret providing an orifice of about 3 to about 10 mils is preferred although orifices of larger diameter may be employed. Furthermore, orifices of shapes other than round are suitable. A slotted orifice may be used to produce films and ribbons. The shaped article may be washed, stretched, lubricated or otherwise after-treated.

Preferably each complementary reactive intermediate is a liquid under the conditions of the reaction or is dissolved in a liquid diluent. However, one of the said intermediates may be a finely divided solid dispersed in a liquid in which it is at least partially soluble. When diluents are employed it is preferred that the total concentration of the extruded intermediate be at least about 35% by weight of extruded material. Use of higher concentrations promotes compactness of the polymeric structure and reduces the problems associated with handling large volumes of solvents, particularly the organic solvents, which tend to be toxic, expensive, inflammable, etc. Satisfactory solid products can be obtained by using lower concentrations for some sets of complementary intermediates.

The speed at which the formed solid shaped products can be collected will depend upon the specific reactants and reaction conditions, such as the diluents used and the concentration of the reactants in these diluents. Much of the influence exerted by the diluents appears to lie in their effect upon the base strength of the intermediate reactant which is to act as a proton donor in the reaction. For example, the effect is quite marked when water is used as a diluent, but inert diluents for diamines, such as benzene and dioxan, appear to exert little noticeable effect on the course of the reactions involved in this process. Additional functions of the diluents are to control the viscosity of the phases and the interfacial tension between the extruded phase and the bath. For example, it has been noted that the addition of low percentages of N,N-dimethylformamide to viscous spin dopes permits better penetration by the bath and results in higher tenacities.

Useful inert diluents for diamines include dioxan, benzene, tetrahydrofuran, and the like. Suitable inert materials for diluting acid halides, such as acid chlorides and chloroformates, include benzene, toluene, xylene, cyclohexane, trichloroethylene, chlorobenzene, nitrobenzene, heptane, isooctane, diethyl ether, ethyl acetate, methyl amyl ketone, ethylene dichloride, carbon tetrachloride, chloroform, etc. It is essential that the diluents be materials which do not react as readily with either polymer-forming intermediate as does its complementary intermediate, and thus reduce the probability of polymer formation.

While it is sometimes desirable to add an acid acceptor to a system which involves a reaction between a diacid halide and a coreactant, it is not necessary to do so. The particular advantage in using about an equivalent of alkali per equivalent of diamine in the bath is that it regenerates the diamine from any amine hydrohalide that forms, and minimizes the recovery of diamine from bath liquors. The process is ordinarily operated at room temperature, although temperatures ranging from −10° C. to 90° C. have been used successfully.

As previously defined, one of the complementary polymer intermediates contains at least two active hydrogens more reactive than alcoholic hydrogen, i. e. the hydrogen of an alkanol. Among end groups providing such a hydrogen may be mentioned —SH, phenolic-OH, amino-NHR (in which R is H or alkyl) and amidino. The other complementary polymer intermediate contains at least two reactive groups capable of reacting with alcohol to form an ester. Among such groups may be mentioned the acid chloride group, the chloroformate group and the isocyanate group. The use of complementary polymer intermediates which form a self-supporting polymeric structure within 10 seconds after combination at room temperature is preferred. A large variety of suitable such combinations is illustrated in copending U. S. application No. 226,066, filed May 12, 1951, now Patent No. 2,708,617.

The multifunctional organic macromolecular intermediate consists essentially of a member of the class consisting of a hydrocarbon polymer, a polyether and a polythioether, equipped if desired or necessary with functional end groups as required by the conditions of the reaction. Thus the carbon skeleton may be a hydrocarbon polymer, such as polyethylene, which has been provided with reactive groups by a suitable reaction, such as chlorosulfonation, as shown by Example V. It is also possible to utilize polymers prepared from vinyl monomers containing groups which are not reactive under the conditions used, such as the ester groups in vinyl acetate, by forming copolymers with vinyl monomers containing very reactive groups, such as the acid chloride groups of acrylyl chloride. As is shown in Example VI, use of small percentages of the acid chloride in the copolymeric macrointermediate permits formation of a final polymer containing sufficiently few crosslinks that the shaped structures are readily deformable. Furthermore, low molecular weight polyisoprene, polybutadiene, and similar derivatives terminated with amine groups can be utilized readily in the process of the present invention. Representative macromolecular intermediates of this class are described more fully in U. S. 2,647,146. Another method of obtaining hydrocarbons with reactive ends is to oxidize butadiene-isobutylene copolymers containing small percentages of butadiene with nitric acid. The products isolated are essentially polyisobutylene with carboxyl ends, which can be converted to acid halides for use in this process.

Representative polyethers which may be used include the polyoxathiaalkylene glycols, such as poly(1,6-dioxa-9 - thiahendecane), poly(1,4 - dioxa - 7 - thianonane), and poly(1 - oxa - 4 - thiahexane); the poly(alkylene oxide) glycols, such as poly(ethylene oxide) glycol, poly(propylene oxide) glycol, poly(tetramethylene oxide) glycol, and poly(decamethylene oxide) glycol; polydioxolane and polyformals prepared by reacting formaldehyde with other glycols or mixtures of glycols, such as tetramethylene glycol and pentamethylene glycol, and copolyethers derived from more than one glycol. Some of the alkylene radicals in these polyethers may be substituted by arylene and/or cycloaliphatic radicals. Multifunctional polyethers may also be used, as has been demonstrated in the examples. Poly(propylene sulfide) may also be used.

Aliphatic glycols must be provided with hydrogen end groups which are more reactive than the hydrogen of alcoholic hydroxyl or with an end group capable of reacting with alcohol at room temperature to form an ester. Amine ends can be provided by reacting the glycols with acrylonitrile and reducing. The acid halide ends may be made by reacting the glycol with two mols of a diacid halide. The chloroformate ends can be produced by reacting the glycol with excess phosgene, and isocyanate ends can be provided by reacting the glycol with a diisocyanate.

The polyfunctional essentially monomeric organic polymer intermediate may be any polymer-forming molecule corresponding to the formulae

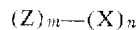

and

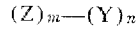

wherein $n$ is a small integer greater than 1, X is hydrogen more active than alcoholic hydrogen, Y is a group capable of reacting with alcohol at room temperature to form an ester, Z is an organic radical and $m$ is a small number at least 1. Among such materials may be mentioned alkylene diamines such as ethylene diamine, propylene diamine, hexamethylene diamine, as well as phenylene diamine, diaminocyclohexane, diethylene triamine, adipyl chloride, sebacyl chloride, terephthaloyl chloride, phenols such as resorcinol, the bis chloroformates of the alkylene glycols and the like.

The shaped bodies of the present invention are of continuous and uniform cross-section, i. e. they are solid without soft or open centers. In general, these structures are relatively stable to hydrolysis under the conditions used for commercial laundering. This is an important attribute for filaments which are to be utilized in fabrics subject to washing. Most are more resistant to oxidation than are the conventional elastic filaments. If desired, their stability can be improved by incorporating commercially available antioxidants and ultra-violet light stabilizers.

The high tenacity, high initial modulus, excellent abrasion resistance, and easily controlled elongation of the elastic structures prepared by the process of this invention fit them for many applications, particularly in film and filament form, for which rubber is undesirable. A particular advantage is that uncovered low denier multifilaments can be used to prepare sheer elastic fabrics. An important additional advantage, particularly for filaments, is that solid structures are obtained by a simple process. A large percentage of the rubber threads used are prepared by slitting rubber sheets. This produces relatively large denier filaments, which cannot be converted readily into multifilaments and are not acceptable for many uses, particularly in certain fabrics.

In general, the process of this invention provides a very useful tool for preparing films and fibers comprising high molecular weight condensation polymers. The process circumvents many of the normal steps required for converting polymeric materials into useful shaped articles. It provides the only method for the preparation of shaped articles from certain polymeric materials, for example, those prepared from intermediates that are unstable at the high temperatures normally required in the condensation reaction. It provides a method for preparing elastic polymers of sufficiently high molecular weight at room temperatures that the shaped articles are useful. Also, intermediates which would normally be too impure for conventional melt polymerization can be used. In addition, there is no need to maintain a delicate balance of materials in order to obtain high molecular weight polymer, as is required by melt polymerization. There is also provided a new method for preparing films and filaments comprising certain cross-linked polymers.

Many equivalent modifications will be apparent to those skilled in the art from a reading of the above description without a departure from the inventive concept.

What is claimed is:

1. A process which comprises forming a solid shaped structure by combining at least two liquid complementary reactive polymer intermediates, one of which contains at least two active hydrogens more reactive than alcoholic hydrogen, whereas its complement contains at least two reactive groups capable of reacting with alcohol at room temperature to form an ester, and at least one of the said complementary reactive polymer intermediates being a multifunctional organic macromolecule, having a molecular weight within the range of from about 400 to about 7000, the said macromolecule consisting essentially of at least one member selected from the group consisting of a hydrocarbon polymer, a polyether and a polythioether, and at least one of the other of the said complementary reactive polymer intermediates being a polyfunctional, monomeric, organic molecule, the proportionate molecular weights of macromolecular intermediate to the monomeric molecular intermediate being such that at least about 30% by weight of the final shaped structure is contributed by the macromolecular intermediate while at least about 10% by weight of the final shaped structure is contributed by the monomeric molecular intermediate, the combination of the said complementary intermediates being accomplished by extruding through an orifice one said complementary polymer intermediate into the other.

2. The process of claim 1 wherein the macromolecular intermediate comprises at least about 60% by weight of the final shaped article.

3. The process of claim 1 wherein the extruded liquid contains a macromolecular intermediate.

4. The process of claim 1 wherein the macromolecular intermediate is essentially a hydrocarbon polymer.

5. The process of claim 1 wherein the macromolecular intermediate is essentially a polyether.

6. The process of claim 1 wherein the macromolecular intermediate is essentially a polythioether.

7. The process of claim 1 wherein the active hydrogens more active than alcoholic hydrogen are supplied by a mercaptan radical.

8. The process of claim 1 wherein the active hydrogens more active than alcoholic hydrogen are supplied by a phenolic hydroxyl radical.

9. The process of claim 1 wherein the active hydrogens more active than alcoholic hydrogen are supplied by an amino-NHR radical wherein R is a member of the class consisting of hydrgoen and alkyl.

10. The process of claim 1 wherein the active hydrogens more active than alcoholic hydrogen are supplied by an amidino radical.

11. The process of claim 1 wherein the reactive groups capable of reacting with alcohol at room temperature to form an ester are acid chloride.

12. The process of claim 1 wherein the reactive groups capable of reacting with alcohol at room temperature to form an ester are carbonyl chloride.

13. The process of claim 1 wherein the reactive groups capable of reacting with alcohol at room temperature to form an ester are chloroformate.

14. The process of claim 1 wherein the reactive groups capable of reacting with alcohol at room temperature to form an ester are isocyanate.

15. The process of claim 1 wherein the complementary reactive intermediates combine to form an amide.

16. The process of claim 1 wherein the complementary reactive intermediates combine to form a urethane.

17. The process of claim 1 wherein the complementary reactive intermediates combine to form a urea.

18. The process of claim 1 wherein the complementary reactive intermediates combine to form an ester.

19. The process of claim 1 wherein the complementary reactive intermediates combine to form a sulfonamide.

20. The process of claim 1 wherein each complementary reactive intermediate contains only two reactive groups.

References Cited in the file of this patent

UNITED STATES PATENTS 2,708,617    Magat _____ May 17, 1755

UNITED STATES PATENT OFFICE

CERTIFICATE OF CORRECTION

Patent No. 2,813,776

November 19, 1957

Charles R. Koller

It is hereby certified that error appears in the printed specification of the above numbered patent requiring correction and that the said Letters Patent should read as corrected below.

Figure 2:
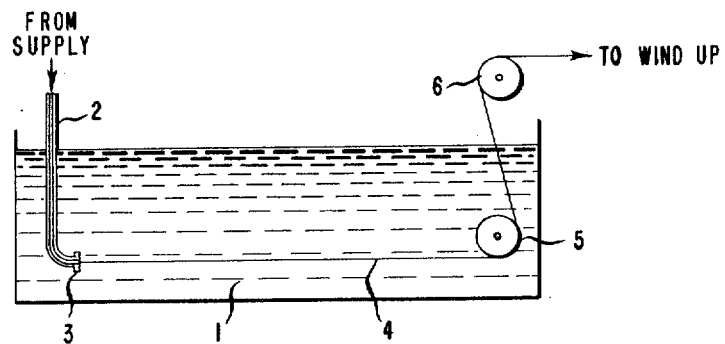
Figure 2 is an illustration of a cross-sectional element of a filament prepared in accordance with the present invention.

Column 1, line 71, for "hydrogen" read -- hydrocarbon --; column 2, lines 25 and 30, for "Figure 1" read -- Figure 2 --; same column, line 27, for "Figure 2" read -- Figure 1 --; column 10, line 16, list of references cited, for the date "May 17, 1755" read -- May 17, 1955.

Signed and sealed this 28th day of January 1958.

(SEAL)

Attest:

KARL H. AXLINE

Attesting Officer

ROBERT C. WATSON
Commissioner of Patents